June 15, 1948.   C. E. TACK   2,443,587
SHOCK STRUT
Filed March 29, 1943   2 Sheets-Sheet 1
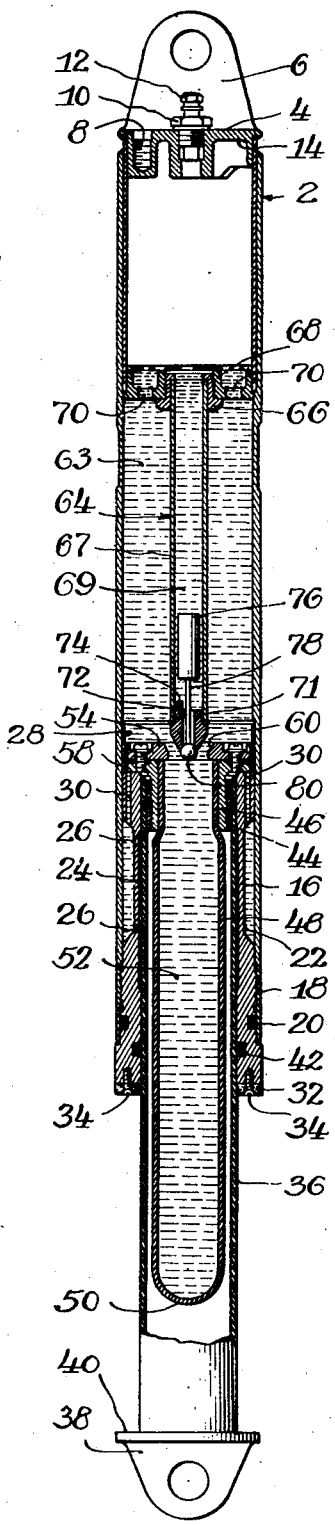
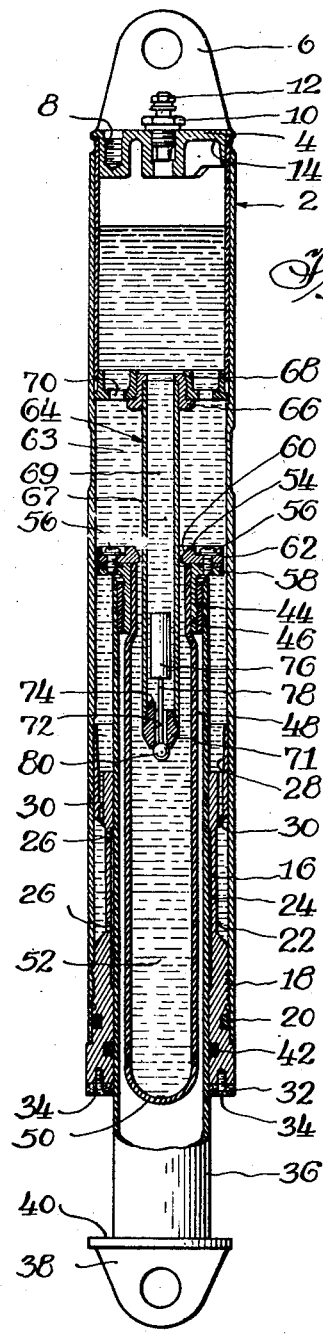
INVENTOR.
Carl E. Tack
BY
Atty.

June 15, 1948.  C. E. TACK  2,443,587
SHOCK STRUT
Filed March 29, 1943  2 Sheets-Sheet 2
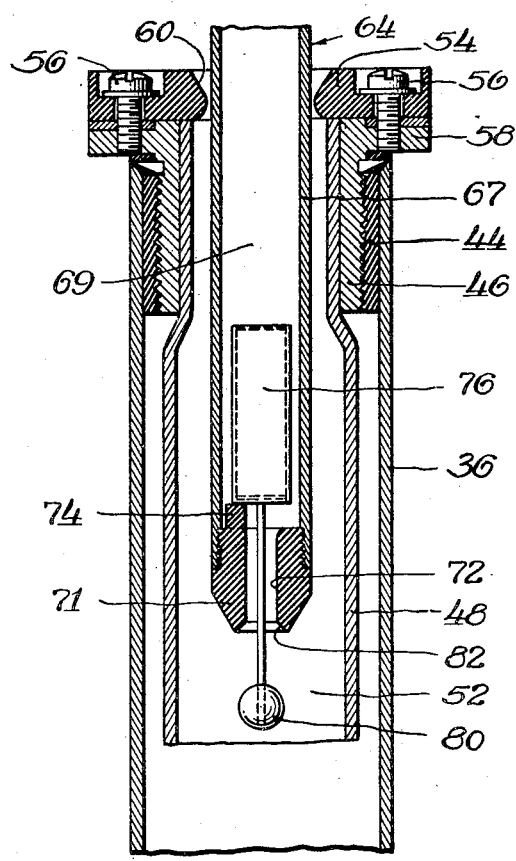
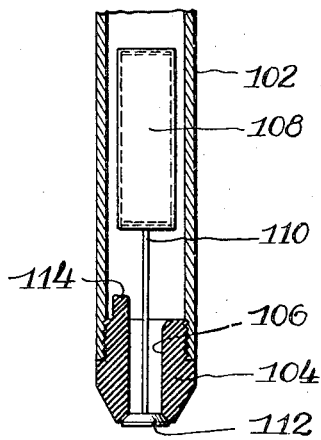
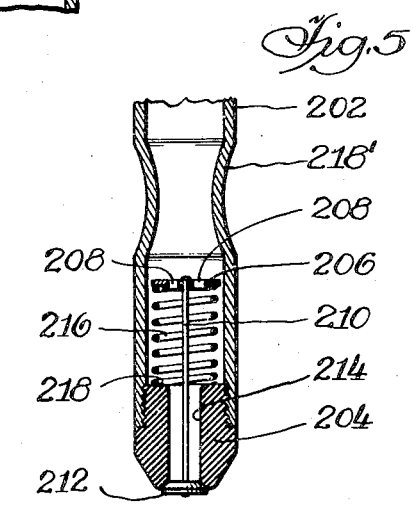
INVENTOR.
Carl E. Tack
BY
Atty.

Patented June 15, 1948

2,443,587

UNITED STATES PATENT OFFICE 2,443,587

SHOCK STRUT

Carl E. Tack, Chicago, Ill., assignor to American Steel Foundries, Chicago, Ill., a corporation of New Jersey Application March 29, 1943, Serial No. 480,899

22 Claims. (Cl. 267—64)

My invention relates to shock absorbing devices, and more particularly to shock struts interposed between the fuselage or wings and the landing wheels of an aircraft for absorbing the landing shocks thereof and resiliently supporting the same when taxiing.

My novel device is of the type in which a pair of members are disposed in telescopic relationship, the device being filled with liquid, such as oil, which is forced through an orifice to yieldingly resist movement of the members toward each other in what may be termed the closure stroke of the device, release means being provided by compressed air or other resilient means which is compressible during the closure stroke and is operable to urge the members apart in what may be termed the release or extension stroke of the device.

An object of my invention is to design a device of the above described type in which a piston-cylinder is reciprocal within an associated cylinder carrying a metering pin reciprocal within a chamber formed within the piston-cylinder.

A further object of my invention is to provide a metering pin having an axial passage with a valve operable to permit flow of liquid therethrough in one direction only. In the embodiments of my invention disclosed herein the valve is operable to permit flow of liquid through the passage on the extension stroke of the device, and to prevent such flow on the closure stroke, thus facilitating rapid release or extension of the device while affording maximum shock absorbing capacity on the closure stroke thereof.

Still another object of my invention is to provide an arrangement such as above described in which the piston-cylinder is operable on the extension stroke of the device to force liquid into a guide or bearing carried by the cylinder, whereby the engagement between the piston-cylinder and said bearing is lubricated.

A further object of my invention is to design an arrangement in which the liquid is forced into passages in the piston-cylinder guide, as above described, by means of a dashpot chamber formed in the guide.

My invention comprehends a metering pin of novel form comprising a passage from end to end thereof, and a valve mechanism operable to permit flow of fluid therethrough in one direction only, said valve mechanism being of a float or spring actuated type, as desired.

In the drawings, Figure 1 is a sectional view taken through the longitudinal axis of my novel shock absorbing device and Figure 2 is a view identical with Figure 1 but showing the device in a partially closed position.

Figure 3 is a fragmentary sectional view of the device shown in Figures 1 and 2 showing the conditions prevailing on the extension stroke of the device.

Figures 4 and 5 are fragmentary sectional views showing modifications of my novel metering pin.

Describing my invention in detail and referring first to the embodiment thereof shown in Figures 1 to 3 inclusive, the device comprises a top follower in the form of a cylinder 2, the head 4 of which is provided with a bracket 6 affording securement to the fuselage or wings of an associated aircraft, and the head 4 is also provided with auxiliary securing means 8 and with a filler plug 10 and an air valve 12 of usual form. Formed on the inner surface of the head 4 may be an air pocket 14.

A piston guide or bearing 16 may be afforded threaded connection at 18 to the cylinder 2 and said connection may be made liquid impervious by means of a packing ring 20 of any suitable material, such as rubber. Formed in the outer perimeter of the bearing 16 may be an annular channel or recess 22 communicating with an annular channel or recess 24 in the inner perimeter of the bearing by means of ports 26, 26. On the upper end of the bearing 16 may be formed an annular flange having a tapered inner perimeter defining a dashpot chamber 28 which may be connected by means of conduits 30, 30 to the channel 22. On the lower end of the bearing 16 an annular wiper 32 of felt or other suitable material may be secured as at 34, 34 for wiping engagement with the bottom follower or piston-cylinder 36 slidably received within the bearing 16 and provided at the lower end thereof with a bracket 38 affording securement to an associated landing wheel.

The piston-cylinder 36 may be formed with a shoulder 40 for abutment with the wiper 32 to limit the closure stroke of the device. It will be understood that the engagement between the piston-cylinder and the bearing 16 may be sealed by means of the wiper 32 and by means of a packing ring 42 which may be formed of any suitable material, such as rubber.

A bushing 44 may be secured in any convenient manner to the piston-cylinder 36 and may have threaded connection to a sleeve 46, which may be secured in any convenient manner, as by brazing, to a tube 48, having a closed end 50 and affording a high pressure chamber 52 within the piston-cylinder. A piston plate 54 may be secured at 56, 56 (Figure 2) to a flange 58 which may be formed on the sleeve 46 and said plate may be provided with an orifice 60 formed along a smooth radius in order to facilitate laminar flow of fluid therethrough, thus avoiding an undesirable foaming of said liquid. It may be noted that the plate 54 and the flange 58 may function as a piston head and may define with the inner surface of the cylinder 2 an orifice 62 (Figure 2), said piston head being reciprocal within what may be termed the working chamber 63 of the cylinder 2.

A metering pin, generally designated 64, may be mounted by means of a hexagonal seat member 66 on a bulkhead 68 which may be carried by the cylinder 2, said bulkhead being formed with orifices 70, 70. The metering pin 64 may be formed of a tube 67 affording a longitudinal passage 69 through the pin and a head 71 may be threaded on the lower end of said tube, and said head may be provided with a passage 72 and a stop lug 74. A float member 76 filled with air or other suitable gas may be positioned within the passage 69 and may be connected by means of a rod 78 to a seat member 80 of spherical form, said member being adapted for engagement with a tapered seat 82 (Figure 3) which may be formed on the outer extremity of the passage 72 through the head 71. It will be understood that the float member 76, the seat member 80, and the head 71 constitute a valve mechanism functioning to permit flow of fluid through the metering pin in one direction only, as hereinafter more fully described.

In assembling my novel shock absorbing device, the parts may be assembled as shown in Figure 1, and the device may be closed until the shoulder 40 abuts the pad 32; thereafter the device may be filled with any suitable liquid, such as oil, through the filler plug 10 until the same overflows. A predetermined amount of air may then be pumped through the valve 12. It will be understood that the compressed air will normally force the device to the open position shown in Figure 1 and in this position the float member 76 will maintain the seat member 80 in engagement with the seat 82 to close the passage through the metering pin. As the device is compressed, as shown in Figure 2, the metering pin is telescoped within the high pressure chamber 52 whereby the liquid is metered through the orifice 60, some metering also taking place through the orifices 62 and 70, 70. It will be understood that by varying the size of the orifices 60, 62 and 70, 70 various characteristics may be imparted to the device.

On the release or extension stroke of the device, hydraulic pressure is built up within the passage 69 to urge the float member 76 against the stop lug 74 (Figure 3) and to permit flow of liquid through the metering pin, thus facilitating rapid release of the device. When the piston head enters the dashpot chamber 28 at the end of the extension stroke, it will be apparent that the movement of the piston-cylinder 36 is decelerated and liquid is forced through the conduits 38, 38 into the channel 22 and thence to the channel 24 where said liquid comes into contact with the outer diameter of the piston-cylinder 36 and lubricates the engagement thereof with the bearing 16. It will thus be seen that the dashpot chamber 28 serves a dual purpose in dampening the release stroke adjacent the end thereof and in affording means for building up hydraulic pressure to urge the liquid through the conduits 38, 38 as above described.

It will be apparent to those skilled in the art that as the device is closed, the air therein is compressed against the head 4 of the cylinder, as may be seen from a comparison of Figures 1 and 2. The compressed air thus serves as release means to urge the cylinder and cylinder-piston into the position shown in Figure 1. However, it will be understood that, if desired, any suitable resilient release means may be substituted for the compressed air such as, for example, a coil spring adapted to be compressed between the bulkhead 68 and the piston head of the piston-cylinder 36.

A modification of my novel metering pin is shown in Figure 4 wherein the pin may be formed of a tube 102, and a head 104 threaded on the end thereof, and said head may be provided with a passage 106. A float member 108 may be positioned within the tube 102 and may be connected by means of a rod 110 to a seat member 112 adapted for complementary engagement with a tapered seat formed at the outer extremity of the passage 106. The float member 108 may be restricted in its movement toward said extremity by means of the stop lug 114 which may be formed on the head 104. It will be understood that this arrangement is substantially identical with that shown in Figures 1 to 3 inclusive except for the fact that the seat member 112 is a flat member with a tapered seating surface rather than a spheroidal member as shown in the previous embodiment.

Figure 5 shows still another modification of my novel metering pin wherein said pin may be formed of a tube 202 and threaded on the end of said tube may be a head 204. A spring plate or seat 206 with passages 208, 208 therethrough may be positioned within the tube 202 and may be connected by means of a rod 210 to a seat member 212 having a tapered seating surface for complementary engagement with the outer extremity of a passage 214 which may extend through the head 204. A spring 216 may be seated at 218 at one end thereof against the head and may be seated at the opposite end thereof against the seat 206. It will be understood that in this modification the spring 216 will be operative to maintain the seat member 212 in sealing engagement with the outer extremity of the passage 214 until sufficient hydraulic pressure is built up against the spring plate 206 and the member 212 to compress the spring 216 and thus urge the member 212 outwardly from its engagement with the outer extremity of the passage 214. It may be noted that in this modification of my device the tube 202 may be formed with an indenture as at 218' in the outer diameter thereof whereby the associated fluid may be metered at a variable rate of flow through the associated orifice.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a shock absorber device, a top follower in the form of a cylinder, a hydraulic fluid chamber therein, a bottom follower in the form of a piston-cylinder reciprocal within said chamber, a high pressure chamber within said piston-cylinder, an orifice defined by the head of said piston-cylinder and the inner surface of said fluid chamber, an orifice through said head communicating with said high pressure chamber, and a metering pin carried by said cylinder and reciprocal within said high pressure chamber through said last mentioned orifice, said metering pin having a central passage opening at one end thereof into said fluid chamber and at the other end thereof into said high pressure chamber, and valve means operable to open said passage on the extension stroke of the device and to close said passage at other times, said valve means comprising a float member within said passage, a seat member adapted to seal the lower extremity of said passage, rigid means connecting said float member to said seat member, and stop means for limiting movement of the float member toward said extremity.

2. In a shock absorber device, a top follower in the form of a cylinder, a hydraulic fluid chamber therein, a bottom follower in the form of a piston-cylinder reciprocal within said chamber, a high pressure chamber within said piston-cylinder, an orifice defined by the head of said piston-cylinder and the inner surface of said fluid chamber, an orifice through said head communicating with said high pressure chamber, and a metering pin carried by said cylinder and reciprocal within said high pressure chamber through said last-mentioned orifice, said metering pin having a central passage extending from end to end thereof and opening at one end thereof into said fluid chamber and at the other end thereof into said high pressure chamber and valve means operable to open said passage on the extension stroke of the device and to close said pin at other times, said valve means comprising a seat member adapted to seal the lower extremity of said passage and resilient means for urging said seat member into engagement with said passage, and means for supporting said pin within said cylinder, said last-mentioned means comprising means independent of said valve means permitting flow of hydraulic fluid upwardly within said fluid chamber on the closure stroke of the device.

3. In a shock absorber device, a top follower in the form of a cylinder having a working chamber, a bottom follower in the form of a piston-cylinder reciprocal within said chamber, a bearing carried by the lower end of said cylinder having slidable engagement with said piston-cylinder, an annular recess formed in the inner perimeter of said bearing, a dashpot chamber formed in the upper end of said bearing, passages affording a connection between said dashpot chamber and said recess, a high pressure chamber within said piston-cylinder, a piston head on said piston cylinder comprising an orifice communicating with said high pressure chamber, an orifice defined by said head and the inner surface of said working chamber, and a metering pin carried by said cylinder and reciprocal within said high pressure chamber.

4. In a shock absorber device, a top follower in the form of a cylinder, a hydraulic fluid chamber therein, a bottom follower in the form of a piston-cylinder reciprocal within said chamber, a high pressure chamber within said piston-cylinder, an orifice defined by the head of said piston-cylinder and the inner surface of said fluid chamber, an orifice through said head communicating with said high pressure chamber, and a metering pin within said cylinder and reciprocal within said high pressure chamber through said last-mentioned orifice, said metering pin having a central passage extending from end to end thereof, the upper end end of said passage opening into said fluid chamber, valve means operable to open said passage on the extension stroke of the device and to close said passage at other times, and means for supporting said pin from said cylinder, said last-mentioned means comprising means independent of said valve means and permitting flow of hydraulic fluid upwardly within said fluid chamber on the closure stroke of the device.

5. In a shock absorber device, a cylinder having a hydraulic fluid chamber, a piston-cylinder reciprocal therein, said piston-cylinder comprising a high pressure chamber open at one end thereof, an orifice defined by the inner surface of said cylinder and by said piston-cylinder, an orifice communicating with said high pressure chamber, a metering pin disposed within said fluid chamber and carried by said cylinder, said pin being reciprocal within said high pressure chamber through said second-mentioned orifice, an axial passage through said pin communicating with respective chambers at spaced points, valve means effective to close said passage on the closure stroke of the device and to open said passage on the release stroke of the device, and resilient means compressible during said closure stroke.

6. In a shock absorber device, a cylinder having an hydraulic fluid chamber therein, a piston cylinder having a head reciprocal within said chamber, a high pressure chamber within said piston cylinder communicating with an orifice through said head, a bulkhead mounted within said first-mentioned chamber intermediate the ends thereof, a central opening through said bulkhead, other openings therethrough spaced around said central opening, a metering pin mounted on said bulkhead within said central opening for reciprocation within said high pressure chamber through said orifice, said pin having a passage extending from end to end thereof, and valve means operable to open said passage on the extension stroke of the device and to close said passage at other times.

7. In a shock absorber device, a cylinder having an hydraulic fluid chamber therein, a piston cylinder having a head reciprocal within said chamber, a high pressure chamber within said piston cylinder communicating with an orifice through said head, a bulkhead mounted within said first-mentioned chamber intermediate the ends thereof, a central opening through said bulkhead, other openings therethrough spaced around said central opening, a metering pin mounted on said bulkhead within said central opening for reciprocation within said high pressure chamber through said orifice, said pin having a passage extending from end to end thereof, and valve means operable to open said passage on the extension stroke of the device and to close said passage at other times, said valve means comprising a float member within said passage, a seat member adapted to seal one extremity of said passage, means connecting said float member to said seat member, and stop means for limiting movement of said float member toward said extremity.

8. In a shock absorber device, a cylinder having an hydraulic fluid chamber therein, a piston cylinder having a head reciprocal within said chamber, a high pressure chamber within said piston cylinder communicating with an orifice through said head, a bulkhead mounted within said first-mentioned chamber intermediate the ends thereof, a central opening through said bulkhead, other openings therethrough spaced around said central opening, a metering pin mounted on said bulkhead within said central opening for reciprocation within said high pressure chamber through said orifice, said pin having a passage extending from end to end thereof, and valve means operable to open said passage on the extension stroke of the device and to close said passage at other times, said valve means comprising a seat member adapted to close one extremity of said passage, and resilient means for urging said seat member into engagement with said passage.

9. In a shock absorber device, a cylinder having an hydraulic fluid chamber therein, a piston cylinder having a head reciprocal within said chamber, a high pressure chamber within said piston cylinder terminating in an orifice through said head, a bulkhead mounted within said first-mentioned chamber intermediate the ends thereof, a central opening through said bulkhead, other openings through said bulkhead spaced around said central opening, a metering pin mounted on said bulkhead within said central opening, one end of said pin being reciprocal within said high pressure chamber through said orifice, said pin having a passage extending from end to end thereof, and valve means operable to open said passage on the extension stroke of the device and to close said passage at other times, said valve means comprising a float member within said passage, a seat member adapted to close one end of said passage, and means connecting said float member to said seat member.

10. In an hydraulic shock absorber, a cylinder having an internal liquid chamber, a metering pin carried by said cylinder within said chamber, said pin having a passage extending longitudinally thereof and opening at one end thereof into said chamber, means securing said pin within said chamber, said securing means comprising means permitting flow of liquid therethrough independently of said passage, a piston cylinder reciprocal within said chamber and having a high pressure chamber with an orifice receiving the adjacent extremity of said pin, the other end of said passage being disposed in said extremity and opening into said high pressure chamber, and valve means for opening said passage on the extension stroke of the device and closing said passage on the closure stroke thereof.

11. In an hydraulic shock absorber, a cylinder having an internal liquid chamber, a metering pin carried by said cylinder within said chamber, said pin having a passage extending longitudinally thereof and opening at one end thereof into said chamber, means securing said pin within said chamber, said securing means comprising means permitting flow of liquid therethrough independently of said passage, a piston cylinder reciprocal within said chamber and having a high pressure chamber with an orifice receiving the adjacent extremity of said pin, the other end of said passage being disposed in said extremity and opening into said high pressure chamber, and valve means for opening said passage on the extension stroke of the device and closing said passage on the closure stroke thereof, said valve means comprising a float member within said passage, a seat member adapted to close one extremity of said passage, and means connecting said float member to said seat member.

12. In an hydraulic shock absorber, a cylinder having an internal liquid chamber, a metering pin carried by said cylinder within said chamber, said pin having a passage extending longitudinally thereof and opening at one end thereof into said chamber, means securing said pin within said chamber, said securing means comprising means permitting flow of liquid therethrough independently of said passage, a piston cylinder reciprocal within said chamber and having a high pressure chamber with an orifice receiving the adjacent extremity of said pin, the other end of said passage being disposed in said extremity and opening into said high pressure chamber, and valve means for opening said passage on the extension stroke of the device and closing said passage on the closure stroke thereof, said valve means comprising a float member within said passage, a seat member adapted to close one extremity of said passage, means connecting said float member to said seat member, and stop means on said pin within said passage for limiting movement of said float member toward said extremity.

13. In a metering pin for a shock absorber device, an elongated member having a central passage from end to end thereof, a seat member exterior of said passage and adapted for sealing engagement with the adjacent extremity thereof, float means within said passage for urging said member into said engagement, and stop means within said passage for limiting movement of said float means toward said extremity.

14. In a metering pin for a shock absorber device, an elongated member having a central passage from end to end thereof, a seat member exterior of said passage and adapted for sealing engagement with the adjacent extremity thereof, resilient means within said passage for urging said member into said engagement, and a connection between said seat member and said resilient means comprising a spring cap on said resilient means and a rigid member extending through a central opening through said resilient means, said rigid member being connected to said spring cap and said seat member, and fluid passages through said cap aligned with said central opening.

15. In an hydraulic shock absorber, a cylinder having an internal liquid chamber, a metering pin carried by said cylinder within said chamber, said pin having a passage extending longitudinally thereof and opening at one end thereof into said chamber, means securing said pin within said chamber, said securing means comprising means permitting flow of liquid therethrough independently of said passage, a piston cylinder reciprocal within said chamber and having a high pressure chamber with an orifice receiving the adjacent extremity of said pin, the other end of said passage being disposed in said extremity and opening into said high pressure chamber, and valve means for opening said passage on the extension stroke of the device and closing said passage on the closure stroke thereof, said valve means comprising a seat member adapted to close one extremity of said passage, and resilient means for urging said seat member into engagement with said passage.

16. In an hydraulic shock absorber device, a cylinder having a liquid chamber therein, a piston reciprocal within said chamber, a piston head on said piston defining an orifice with the adjacent surface of said chamber, a bearing carried by said cylinder within said chamber, said bearing being sleeved over said piston and comprising an internal surface in slidable abutment therewith, a recess in said last-mentioned surface, a dashpot chamber in the inner extremity of said bearing for reception of said head on the extension stroke of said piston, and means affording a liquid flow passage between said dashpot chamber and said recess.

17. In an hydraulic shock absorber device, a cylinder, a piston member reciprocal therewithin, a bearing carried by said cylinder, said bearing being sleeved over said piston member in slidable abutment therewith, a dashpot chamber within said bearing for reception of the head of said piston member on the extension stroke thereof, means for lubricating the surface of said piston member in abutment with said bearing, and a passage extending between said means and said chamber.

18. In an hydraulic shock absorber device, a top follower in the form of a cylinder, a bottom follower in the form of a piston cylinder reciprocal within said cylinder and comprising a head defining an annular orifice with the interior surface of said cylinder, said piston cylinder comprising a high pressure chamber closed at its lower extremity and terminating at its upper extremity in an orifice through said head, a metering pin carried by said cylinder and reciprocal within said last-mentioned orifice, a passage through said pin communicating at axially spaced points with said cylinder and said chamber respectively, and valve means for closing said passage on the closure stroke of the device and for opening said passage on the extension stroke of the device.

19. In a metering pin for a shock absorber device, a hollow elongated member having a passage therein extending from end to end thereof, a seat member exterior of said passage and adapted for seating engagement with the adjacent extremity thereof, float means within said passage for urging said member into said engagement, and stop means comprising a lug on said elongated member within said passage for engagement with said float means to limit movement thereof toward said extremity.

20. In an hydraulic shock absorber device, a cylinder having a working chamber, a piston-cylinder having a head reciprocal within said chamber, a high pressure chamber within said piston-cylinder, said high pressure chamber containing liquid with the only passage therefor being an orifice through said head, a metering pin carried by said cylinder and reciprocal within said high pressure chamber through said orifice, means intermediate the ends of said cylinder for supporting said pin within said working chamber, said supporting means comprising means permitting the flow of liquid therethrough, passage means extending axially through said pin and communicating at axially spaced points with respective chambers, and valve means for closing said passage means under certain operating conditions and for opening said passage means under other operating conditions.

21. In an hydraulic shock absorber device, a cylinder having an internal liquid chamber, a piston-cylinder having a head reciprocal within said chamber, a high pressure chamber within said piston-cylinder, an orifice defined by the head of said piston-cylinder and the inner surface of said liquid chamber, an orifice through said head communicating with said high pressure chamber, a metering pin carried by said cylinder and reciprocal within said high pressure chamber through said last-mentioned orifice, said pin having a passage extending longitudinally thereof and opening at spaced points into said liquid chamber and said high pressure chamber respectively, means for supporting said pin within said liquid chamber, said supporting means comprising means permitting flow of liquid therethrough independently of said passage, and valve means for opening said passage during axial movement of said piston-cylinder relative to said cylinder in one direction only.

22. In an hydraulic shock absorber device, a cylinder having an internal liquid chamber, a piston-cylinder having a head reciprocal within said chamber, a high pressure chamber within said piston-cylinder, an orifice defined by the head of said piston-cylinder and the inner surface of said liquid chamber, an orifice through said head communicating with said high pressure chamber, a metering pin carried by said cylinder and reciprocal within said high pressure chamber through said last-mentioned orifice, said pin having a passage extending longitudinally thereof and opening at spaced points into said liquid chamber and said high pressure chamber respectively, means for supporting said pin within said liquid chamber, said supporting means comprising means permitting flow of liquid therethrough independently of said passage, and valve means for opening said passage on the extension stroke of the device and closing said passage on the closure stroke thereof, and resilient means compressible during said closure stroke to yieldingly resist contraction of said device.

CARL E. TACK.

REFERENCES CITED

The following references are of record in the file of this patent:

UNITED STATES PATENTS

| Number | Name | Date |
| --- | --- | --- |
| 1,234,311 | Duncan | July 24, 1917 |
| 1,887,060 | Lacroix | Nov. 8, 1932 |
| 1,950,995 | Piccard | Mar. 13, 1934 |
| 2,092,644 | Erny | Sept. 7, 1937 |
| 2,102,847 | Johnson | Dec. 21, 1937 |
| 2,117,716 | Gordy | May 17, 1938 |
| 2,171,185 | Maier | Aug. 29, 1939 |
| 2,174,312 | Cleveland | Sept. 26, 1939 |
| 2,209,603 | Johnson | July 30, 1940 |
| 2,213,242 | Duncan | Mar. 9, 1943 |
| 2,352,401 | O'Connor | June 27, 1944 |
| 2,378,712 | Laraque | June 19, 1945 |

FOREIGN PATENTS

| Number | Country | Date |
| --- | --- | --- |
| 137,585 | Great Britain | Jan. 22, 1920 |
| 297,938 | Great Britain | Dec. 13, 1928 |
| 496,059 | Great Britain | Nov. 24, 1938 |